Figure 1:
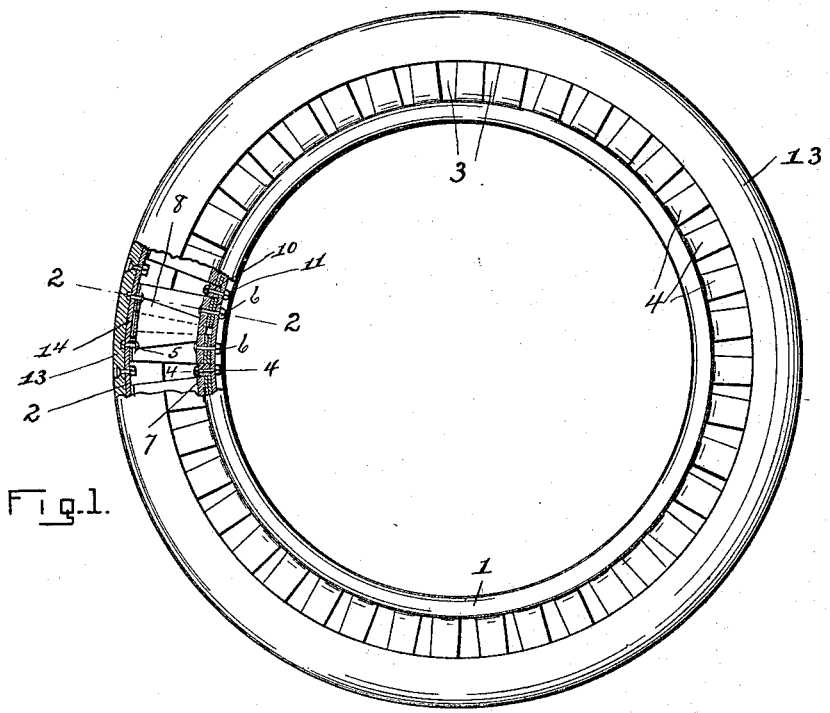

W. H. CLARKSON.
COMBINED DEMOUNTABLE RIM AND RESILIENT TIRE.
APPLICATION FILED DEC. 24, 1914.

1,146,309.

Patented July 13, 1915.
2 SHEETS—SHEET 1.

Witnesses:
Rose A. Leduc
Gertrude M. Pitz

Inventor:
William H. Clarkson
By Frank C. Curtis
Attorney

W. H. CLARKSON.
COMBINED DEMOUNTABLE RIM AND RESILIENT TIRE.
APPLICATION FILED DEC. 24, 1914.
1,146,309.
Patented July 13, 1915.
2 SHEETS—SHEET 2.
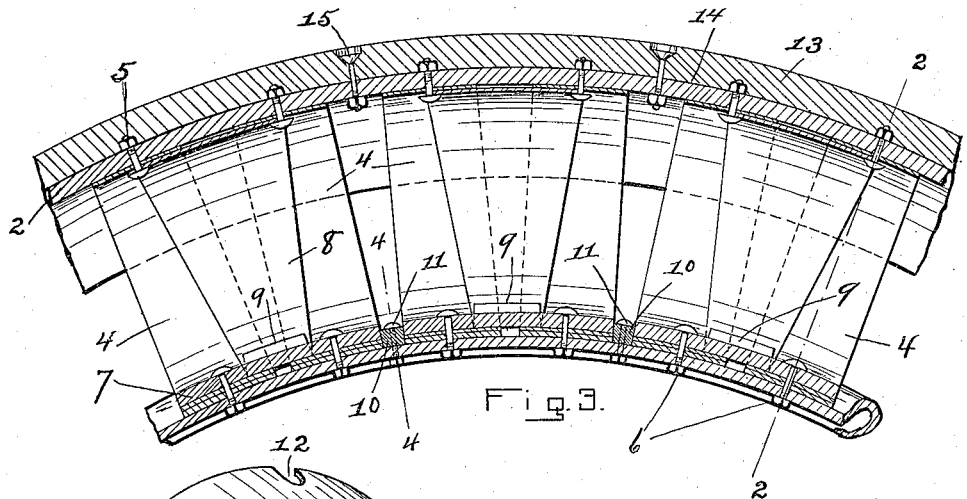
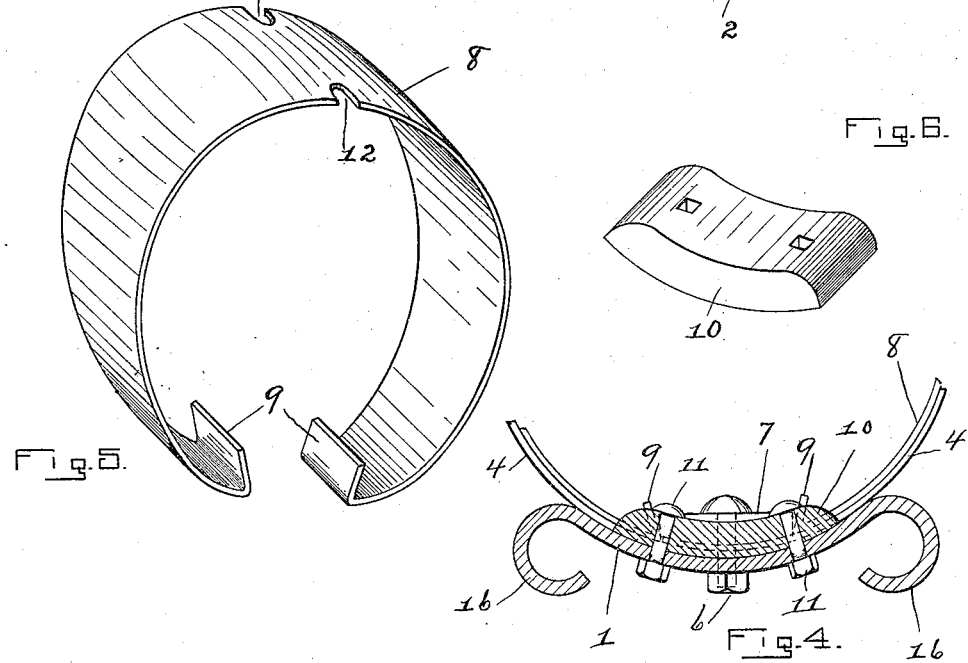
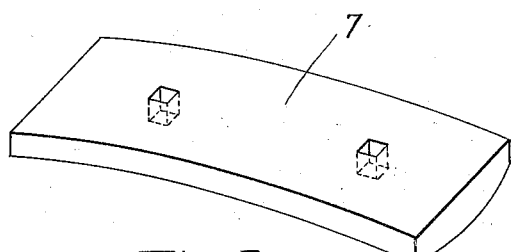
Witnesses:
Rose A. Leduc
Gertrude M. Pitz
Inventor:
William H. Clarkson,
By Frank C. Curtis,
Attorney

UNITED STATES PATENT OFFICE.

WILLIAM H. CLARKSON, OF TROY, NEW YORK.

COMBINED DEMOUNTABLE RIM AND RESILIENT TIRE.

1,146,309.   Specification of Letters Patent.   Patented July 13, 1915.

Application filed December 24, 1914. Serial No. 878,875.

*To all whom it may concern:*

Be it known that I, WILLIAM H. CLARKSON, a citizen of the United States, residing at Troy, county of Rensselaer, and State of New York, have invented certain new and useful Improvements in Combined Demountable Rims and Resilient Tires, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Certain objects of the invention are to provide in demountable form a combined demountable rim and resilient tire for the wheels of automobiles and the like; to provide such ventilation that the rim and tire will not become overheated in use; and to obtain a proper cushioning effect for comfortable riding without the use of a pneumatic device.

Other objects will appear in connection with the following description.

Figure 2:
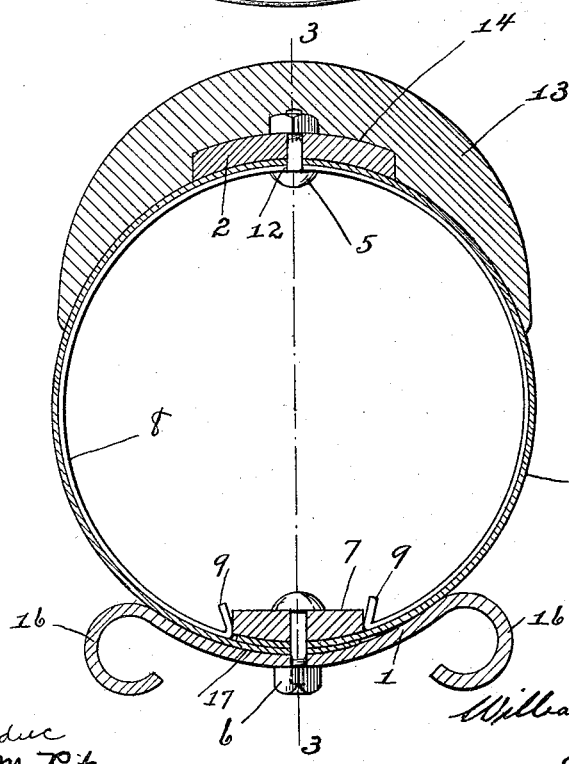

Figure 1 of the drawings is a view in side elevation partly broken away and shown in section of a combined demountable rim and resilient tire embodying my invention. Fig. 2 is a cross-section of the same taken on the broken line 2—2 in Fig. 1 and Fig. 3. Fig. 3 is a longitudinal section of the same taken on the broken line 3—3 in Fig. 2. Fig. 4 is a cross-section of the same taken on the broken line 4—4 in Fig. 1 and Fig. 3. Fig. 5 is a view in perspective of one of the spring-bands which forms the middle member of one of the spring units. Fig. 6 is a view in perspective of a space-block for separating the spring units. Fig. 7 is a view in perspective of one of the clamp-plates whereby a spring unit is mounted upon the inner ring.

Referring to the drawings wherein the invention is shown in preferred form, 1 is an inner rim, and 2 is an outer ring, which two members support the spring-mechanism and shoe, as will be presently explained.

The inner rim, 1, is made of a form adapted to be readily applied to, and be removed from, the wheel of an automobile or the like in the same manner as a demountable rim for a pneumatic tire.

Between the inner rim, 1, and the outer ring, 2, are mounted a series of spring-units, which units are spaced apart to provide ventilating openings, 3, adjacent to the inner rim, 1. For certain purposes of the invention, these spring-units may be formed in any known manner.

In the preferred form of the invention, each spring-unit is made up of two outer spring-bands, 4, and an inner spring-band, 8, lapping on the inner side the neighboring edges of the two outer spring-bands, 4.

The several spring-bands are preferably formed by bending to substantially circular form strips of resilient sheet-steel or other metal, with the ends of the strips 4 overlapping as shown in Fig. 2. Each of the spring-bands, 4, is secured by a bolt, 5, to the outer ring, 2, and by a bolt, 6, to the inner rim, 1.

The bolts, 6, preferably pass through clamp-plates, 7, one clamp-plate for each spring-unit, which clamp-plate extends across the lapping ends of the two spring-bands, 4, of the respective spring-units, as shown in Fig. 3.

The ends of the inner spring-band, 8, do not overlap, but are divergently introverted, as shown at 9, to tightly receive between them the clamp-plate, 7, whereby, as the clamp-plate, 7, is drawn down to its seat by the bolts, 6, it exerts a wedgewise action upon the introverted ends, 9, which tends to expand the band, 8, tightly within the bands, 4.

Spacing-blocks, 10, are mounted by means of bolts, 11, upon the inner rim 1, in the spaces between neighboring spring-units, which spacing-blocks serve to distribute the circumferential stress between the clamp-plates, 7, throughout the extent of the wheel.

The opposite edges of the inner spring-bands, 8, are provided with notches, 12, adapted to receive the pair of bolts, 5, whereby the neighboring outer spring-bands, 4, are secured to the outer ring, 2.

The periphery of the tire is formed of a shoe, 13, of rubber or the like, which extends only part way around the sides of the spring-units, leaving uncovered portions of the openings, 3, adjacent to the inner rim, 1.

The shoe, 13, is formed with a groove, 14, on its inner side adapted to receive the outer ring, 2, and is also provided on its inner side with recesses to receive the heads or nuts of the bolts, 5.

At suitable intervals, preferably opposite the open spaces, 3, the shoe, 13, is secured by a countersunk bolt, 15, to the outer ring, 2.

The inner rim, 1, is provided in its outer surface with a peripheral groove, 17, conforming in cross-section substantially to the curvature of the spring-unit, and its edges are reversely curved to form beads, 16, which extend to points substantially in line with the nuts or heads of the bolts, 6, which are exposed on the inner periphery of the inner rim, 1. The nuts or heads of the bolts, 6, are thus made to form points of support for the rim upon the wheel intermediately of the beads, 16.

The shanks of the bolts, 6, whereby the respective parts are secured together may be of usual form, but I prefer to have them square in cross-section at points where the connected parts exert any considerable shearing stress upon the bolts.

In use, the openings, 3, afford ample opportunity for ingress and egress of air, so that the parts do not become overheated.

My improved device may, if desired, be a permanent part of the wheel.

What I claim as new and desire to secure by Letters Patent is—

1. A device of the class described having an inner rim, an outer ring surrounding the inner rim, and a series of spring-units mounted upon and between said inner rim and said outer ring with ventilating openings between neighboring units, the several spring-units comprising a pair of outer spring-bands bolted to said rim and said outer ring, and an inner spring-band interiorly lapping and expanded within said two outer spring-bands.

2. A device of the class described having an inner rim, an outer ring surrounding the inner rim, and a series of spring-units mounted upon and between said inner rim and said outer ring with ventilating openings between neighboring spring-units, the several spring-units comprising a pair of outer spring-bands bolted to said outer ring, and each having lapping ends adjacent to the inner rim, an inner spring-band interiorly lapping said pair of outer spring-bands, said inner spring-band being bolted to said outer ring and having adjacent to the inner rim divergent introverted ends, and a clamp-plate bolted to the inner rim, said clamp-plate extending across the lapping ends of both outer spring-bands and being in wedgewise engagement with the divergently introverted inner ends of the inner spring-band.

3. A device of the class described having a rim, a series of metal spring-bands disposed at intervals around the rim, clamp-plates whereby said spring-bands are mounted upon the rim, and spacing-blocks secured to the rim in the intervals between neighboring clamp-plates.

In testimony whereof, I have hereunto set my hand this 22nd day of December, 1914.

WILLIAM H. CLARKSON.

Witnesses:
ROSE A. LEDUC,
GERTRUDE M. PITZ.

Copies of this patent may be obtained for five cents each, by addressing the "Commissioner of Patents, Washington, D. C."